(12) United States Patent
Shiraishi et al.

(10) Patent No.: US 11,201,513 B2
(45) Date of Patent: Dec. 14, 2021

(54) ROTOR AND MOTOR

(71) Applicant: Nidec Corporation, Kyoto (JP)

(72) Inventors: Takashi Shiraishi, Kyoto (JP); Toru Chikira, Kyoto (JP); Hiroshi Kitagaki, Kyoto (JP); Masato Aono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 102 days.

(21) Appl. No.: 16/675,262

(22) Filed: Nov. 6, 2019

(65) Prior Publication Data

US 2020/0161914 A1   May 21, 2020

(30) Foreign Application Priority Data

Nov. 20, 2018 (JP) ............................. JP2018-217640

(51) Int. Cl.
*H02K 1/27* (2006.01)
*H02K 1/28* (2006.01)

(52) U.S. Cl.
CPC ............ *H02K 1/2773* (2013.01); *H02K 1/28* (2013.01); *H02K 2201/06* (2013.01); *H02K 2201/09* (2013.01)

(58) Field of Classification Search
CPC .... H02K 1/2773; H02K 1/28; H02K 2201/09; H02K 2201/06; H02K 1/22; H02K 3/50; H02K 11/215; H02K 1/148; H02K 1/276; H02K 1/2766
See application file for complete search history.

(56) References Cited

U.S. PATENT DOCUMENTS

| | | |
|---|---|---|
| 5,786,650 A | 7/1998 | Uchida et al. |
| 5,829,120 A | 11/1998 | Uchida et al. |
| 5,886,441 A | 3/1999 | Uchida et al. |
| 5,889,346 A | 3/1999 | Uchida et al. |
| 5,939,810 A | 8/1999 | Uchida et al. |
| 10,284,037 B2 * | 5/2019 | Miyajima ................ H02K 3/28 |
| 2013/0119808 A1 | 5/2013 | Hirokawa et al. |

(Continued)

FOREIGN PATENT DOCUMENTS

| | | |
|---|---|---|
| CN | 105119402 A | 12/2015 |
| CN | 106712348 A | 5/2017 |

(Continued)

OTHER PUBLICATIONS

Shiraishi et al., "Rotor, Motor, and Rotor Manufacturing Method", U.S. Appl. No. 16/461,019, filed May 15, 2019.

(Continued)

*Primary Examiner* — Thomas Truong
(74) *Attorney, Agent, or Firm* — Keating & Bennett

(57) ABSTRACT

A rotor includes magnets, and a rotor core including thin film cores laminated in an axial direction and magnet holes in which the magnets are located. The rotor core includes first thin plate cores and second thin plate cores. The first thin plate cores include an annular first inner plate, first outer plates on a radially outer side of the inner plate and arrayed side by side in the circumferential direction, first inner connecting portions connecting the inner plate and the outer plate, and a first outer connecting portion that is on a radially outer side of the first outer plate and connects the adjacent outer plates in the circumferential direction.

7 Claims, 12 Drawing Sheets

(56) References Cited

U.S. PATENT DOCUMENTS

| | | | |
|---|---|---|---|
| 2014/0103769 A1* | 4/2014 | Kingrey | H02K 1/2773 |
| | | | 310/156.12 |
| 2014/0103772 A1 | 4/2014 | Kingrey et al. | |
| 2014/0300243 A1 | 10/2014 | Berkouk et al. | |
| 2015/0244218 A1 | 8/2015 | Kaufmann et al. | |
| 2016/0254714 A1* | 9/2016 | Hashizume | H02K 1/2773 |
| | | | 310/90 |
| 2018/0069443 A1* | 3/2018 | Han | H02K 1/27 |

FOREIGN PATENT DOCUMENTS

| | | |
|---|---|---|
| JP | 03-36945 A | 2/1991 |
| JP | 2013-198304 A | 9/2013 |
| JP | 2014-180094 A | 9/2014 |
| WO | 2015/128782 A1 | 9/2015 |

OTHER PUBLICATIONS

Nakahara et al., "Rotor and Motor", U.S. Appl. No. 16/675,260, filed Nov. 6, 2019.

Official Communication issued in corresponding Chinese Patent Application No. 201911125370.7, dated Sep. 28, 2021.

* cited by examiner

ROTOR AND MOTOR

CROSS REFERENCE TO RELATED APPLICATION

The present invention claims priority under 35 U.S.C. § 119 to Japanese Application No. 2018-217640 filed on Nov. 20, 2018, the entire contents of which are hereby incorporated herein by reference.

1. FIELD OF THE INVENTION

The present disclosure relates to a rotor and a motor.

2. BACKGROUND

Conventionally, a motor including a spoke-type rotor is known (for example, JP H06-245451 A).

Such a rotor is, for example, an integral laminated rotor and has an integral thin plate core. The integral thin plate core has an annular connecting portion and a plurality of thin plate core pieces. The plurality of thin plate core pieces are arranged in the circumferential direction on the outer circumferential side of an annular connecting portion. The respective thin plate core pieces are connected by the annular connecting portion and a support portion. Each of the thin plate core pieces is arranged at a predetermined position in a laminated structure of multiple thin plate core pieces, and is connected to the thin plate core piece. A permanent magnet is arranged between adjacent thin plate core pieces.

Meanwhile, in such a rotor, all of the plurality of thin plate core pieces are connected by the annular connecting portion and the support portion in the integral thin film core. As a result, a magnetic flux having flowed from a certain thin plate core piece to the annular connecting portion through the support portion flows into thin plate core pieces located on both sides of the thin plate core piece in the circumferential direction. That is, there is a problem that a short circuit of the magnetic flux occurs and magnetic characteristics deteriorate.

SUMMARY

In view of the above situation, example embodiments of the present disclosure provide rotors and motors that improve magnetic characteristics.

A rotor according to an example embodiment of the present disclosure is a rotor that extends in an axial direction with a central axis as a reference, the rotor including a plurality of magnets, and a rotor core that is defined by a plurality of thin film cores laminated in the axial direction and including magnet holes in which the magnets are located. A magnetic pole surface of the magnet opposes a circumferential direction. The magnet hole includes an opening extending in a radial direction in plan view and penetrating the rotor core in the axial direction. The rotor core includes first thin plate cores and second thin plate cores. The first thin plate cores include an annular first inner plate, first outer plates on a radially outer side of the inner plate and arrayed side by side in the circumferential direction, first inner connecting portions connecting the inner plate and the outer plate, and a first outer connecting portion that is on a radially outer side of the outer plate and connects adjacent ones of the outer plates in the circumferential direction. The second thin plate core includes an annular second inner plate, second outer plates on a radially outer side of the inner plate and arrayed side by side in the circumferential direction, and at least one second inner connecting portion that connects the inner plate and the outer plate in the radial direction. The second thin plate cores are laminated in the axial direction and are sandwiched from two sides in the axial direction by a pair of the first thin plate cores. The first thin plate cores are further laminated on one side of the pair of the first thin plate cores in the axial direction. The first outer connecting portion opposes or comes into contact with the magnet in the radial direction.

According to example embodiments of rotors and motors of the present disclosure, it is possible to improve the magnetic characteristics.

The above and other elements, features, steps, characteristics and advantages of the present disclosure will become more apparent from the following detailed description of the example embodiments with reference to the attached drawings.

DETAILED DESCRIPTION

A Z-axis direction appropriately illustrated in each drawing is an up-and-down direction in which a positive side is an upper side and a negative side is a lower side. A central axis J appropriately illustrated in each drawing is a virtual line which is parallel to the Z-axis direction and extends in the up-and-down direction. In the following description, an axial direction of the central axis, that is, a direction parallel to the up-and-down direction will be simply referred to as the "axial direction", a radial direction having its center on the central axis J will be simply referred to as the "radial direction", and a circumferential direction having its center on the central axis J will be simply referred to as the "circumferential direction". In the example embodiment, the upper side corresponds to one side in an axial direction, and the lower side corresponds to the other side in the axial direction. Note that the up-and-down direction, the upper side, and the lower side are simply names for describing a relative positional relationship of each portion, and an actual arrangement relationship or the like may be an arrangement relationship other than the arrangement relationship indicated by these names.

Figure 1:
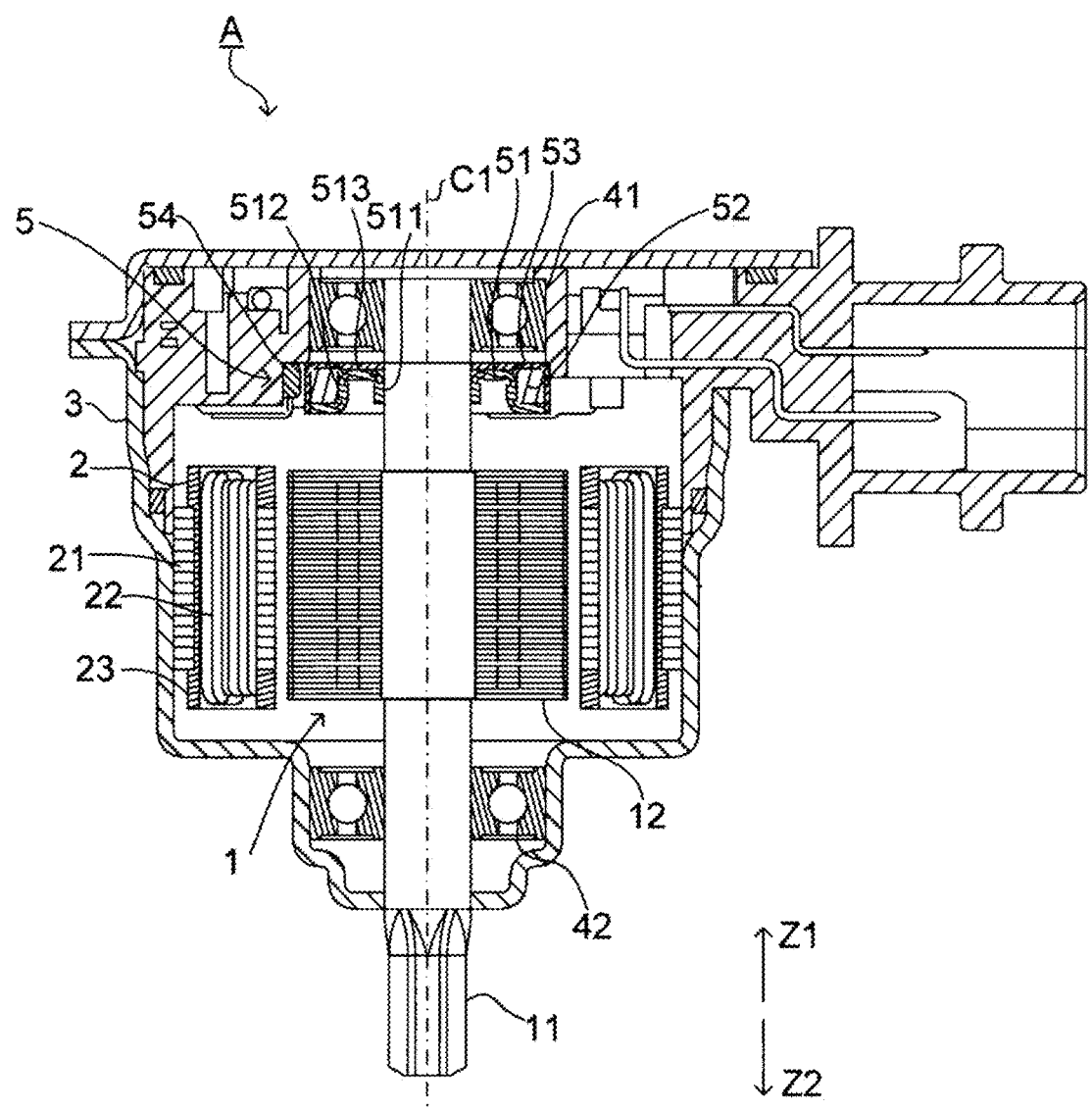
FIG. 1 is a cross-sectional view of a motor according to an example embodiment of the present disclosure.

A schematic configuration of a motor according to an example embodiment of the present disclosure will be described. FIG. 1 is a cross-sectional view of a motor A.

The motor A illustrated in FIG. 1 includes a rotor 1, a stator 2, a housing 3, a first bearing 41, and a second bearing 42. In addition, the motor A includes a sensor unit 5 that detects a rotational position of the rotor 1.

The housing 3 has a tubular shape extending in the axial direction, and accommodates the rotor 1 and the stator 2 therein. The stator 2 is fixed to an inner circumferential surface of the housing 3. The stator 2 is fixed inside the housing 3 such that the housing 3 and a central axis (central axis C1) coincide with each other.

The stator 2 surrounds the radially outer side of the rotor 1. That is, the stator 2 opposes the rotor 1 in the radial direction. The stator 2 has a substantially annular shape in a top view, and the central axis of the stator 2, which is an axis passing through the center of the substantially annular shape in the axial direction, coincides with the central axis C1. The stator 2 includes a stator core 21, coils 22, and an insulator 23. The stator 2 opposes the rotor 1 and includes the plurality of coils 22.

The coil 22 is formed by winding a conducting wire around an outer circumference of the insulator 23 that covers an outer surface of the stator core 21. An end of the conducting wire is drawn out from the coil 22, and the end of the conducting wire extends from an end on axially one side of the stator 2 to the axially one side. The stator core 21 is excited by supplying electric power to the coil 22 through the conducting wire. For example, the coil 22 of the motor A is divided into three phases (U, V, and W). A sinusoidal current whose phase has been shifted is supplied to each of the phases. Therefore, the conducting wire is provided as many as the number that enables the current supply to each of the three phases. In the present example embodiment, there are two sets of three phases.

The rotor 1 includes a shaft 11, a rotor core 12, and a magnet (not illustrated). The shaft 11 has a cylindrical shape that extends along the central axis C1. That is, the rotor 1 extends in the axial direction with the central axis C1 as a reference. The shaft 11 is rotatably supported by the housing 3 via the first bearing 41 and the second bearing 42. As a result, the rotor 1 can rotate with respect to the stator 2 around the central axis C1. In the present example embodiment, the number of magnets is fourteen. That is, the number of magnetic poles of the rotor 1 is fourteen. The number of magnets and the number of magnetic poles are not limited to the above number.

The rotor core 12 is constituted by a plurality of thin plate cores laminated in the axial direction. The rotor core 12 is located on the radially outer side of the shaft 11 and is directly fixed to the shaft 11. Specifically, the shaft 11 is fixed to the rotor core 12 by press-fitting. Note that the fixing is not limited to press-fitting, and can be performed by adhesion with an adhesive, for example. The rotor core 12 has a plurality of magnet holes 126 penetrating in the axial direction with reference to FIG. 4. When viewed from the axial direction, an outer shape of an opening of the magnet hole 126 is a substantially rectangular shape extending in the radial direction. The magnet holes 126 are arranged at intervals in the circumferential direction. Magnets are arranged inside the magnet holes 126, respectively. That is, the rotor 1 includes the plurality of magnets and the rotor core 12 having the plurality of magnet holes 126. The motor A of the example embodiment has a so-called spoke-type rotor. The magnet hole 126 has the opening extending in the radial direction in plan view, penetrates the rotor core 12 in the axial direction, and has the magnet arranged therein. That is, the magnet hole 126 extends in the radial direction in plan view. When viewed from the axial direction, each of the magnets extends with the radially outer side as the longitudinal direction. Magnetic pole surfaces (the N pole and S pole) of each of the magnets face the circumferential direction. That is, the magnetic pole surface of the magnet faces any side of the circumferential direction.

Here, the first bearing 41 and the second bearing 42 are configured using ball bearings. The first bearing 41 and the second bearing 42 are arranged on the upper and lower sides, respectively, and support the shaft 11 to be rotatable. The bearing may be configured using a sleeve bearing, for example.

The sensor unit 5 includes a sensor yoke 51, a sensor magnet 52, a sensor cover 53, and a rotation sensor 54. The sensor yoke 51 is a substantially cylindrical member. The sensor yoke 51 is made of a ferromagnetic material. The sensor yoke 51 has a tubular inner wall 511, a tubular outer wall 512, and a top plate 513. In the present example embodiment, the inner wall 511 and the outer wall 512 are cylindrical. In the sensor yoke 51, an inner surface of the inner wall 511 is fixed to an outer circumferential surface of the shaft 11. As a result, the sensor yoke 51 is fixed to the shaft 11.

The outer wall 512 is located on the radially outer side of the inner wall 511 and surrounds the inner wall 511 in the circumferential direction. That is, the sensor yoke 51 has a double cylindrical shape. The top plate 513 has an annular shape that connects an upper end of the inner wall 511 and an upper end of the outer wall 512.

The sensor magnet 52 has an annular shape. The sensor magnet 52 is held by the sensor yoke 51. For example, the sensor magnet 52 is fitted to the outer wall 512 from the radially outer side. As a result, the sensor magnet 52 is indirectly fixed to the shaft 11 via the sensor yoke 51. The sensor magnet 52 may be directly fixed to the shaft 11.

The rotation sensor 54 opposes the sensor magnet 52 in the radial direction with a gap interposed therebetween. The rotation sensor 54 is, for example, a Hall IC and a plurality of the rotation sensors 54 are provided. The rotation sensor 54 detects a change in magnetic flux of the sensor magnet 52. A rotational position of the rotor 1 is calculated by a control device or the like (not illustrated) that controls the motor A based on the detected change in magnetic flux. The rotation sensor 54 may oppose the sensor magnet 52 in the axial direction with a gap interposed therebetween. Although the sensor using the Hall IC is used in the present example embodiment, the disclosure is not limited thereto. For example, sensors such as a resolver capable of detecting the rotation of the rotor 1 can be widely employed.

Figure 2:
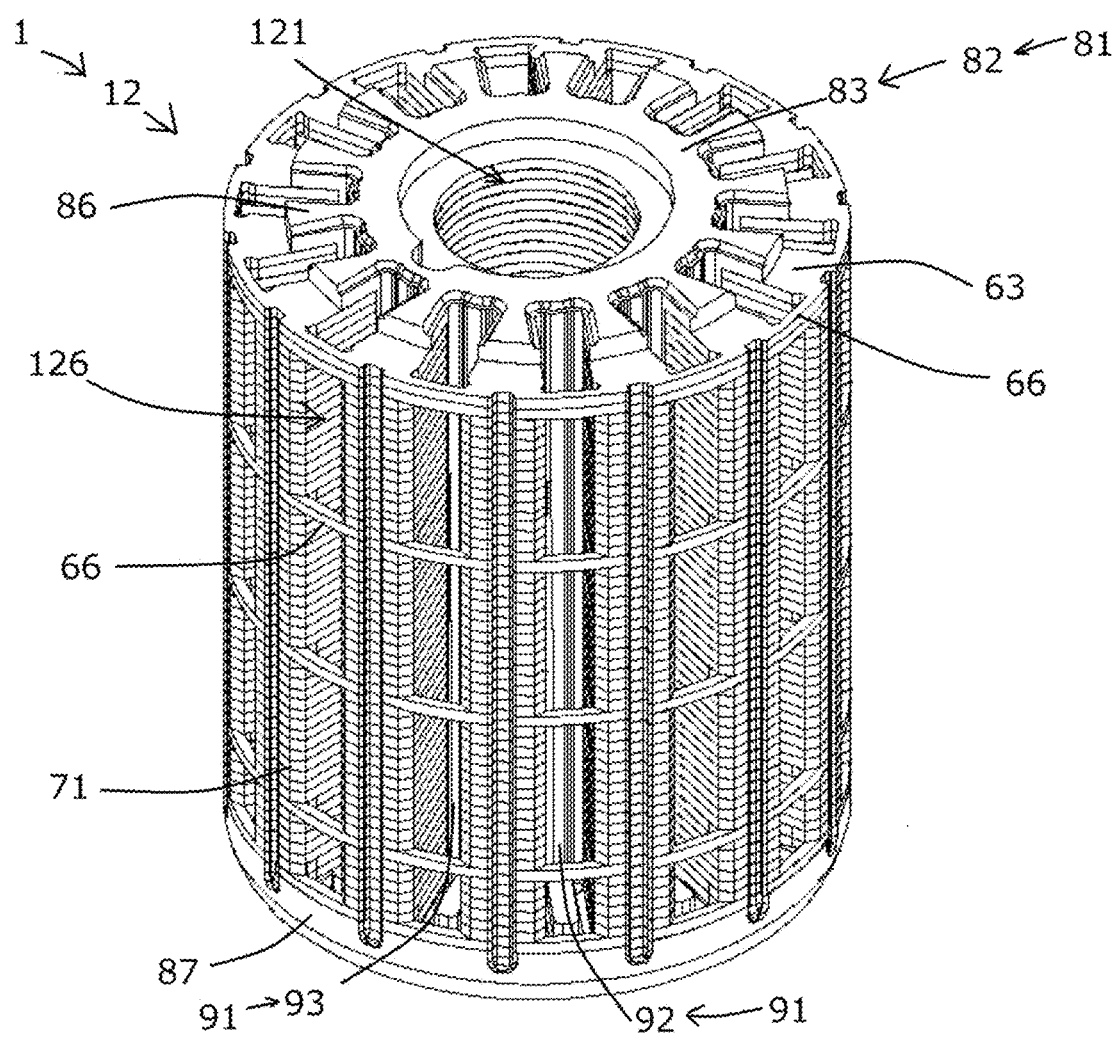
FIG. 2 is a perspective view of a rotor according to an example embodiment of the present disclosure as viewed from above.
Figure 3:
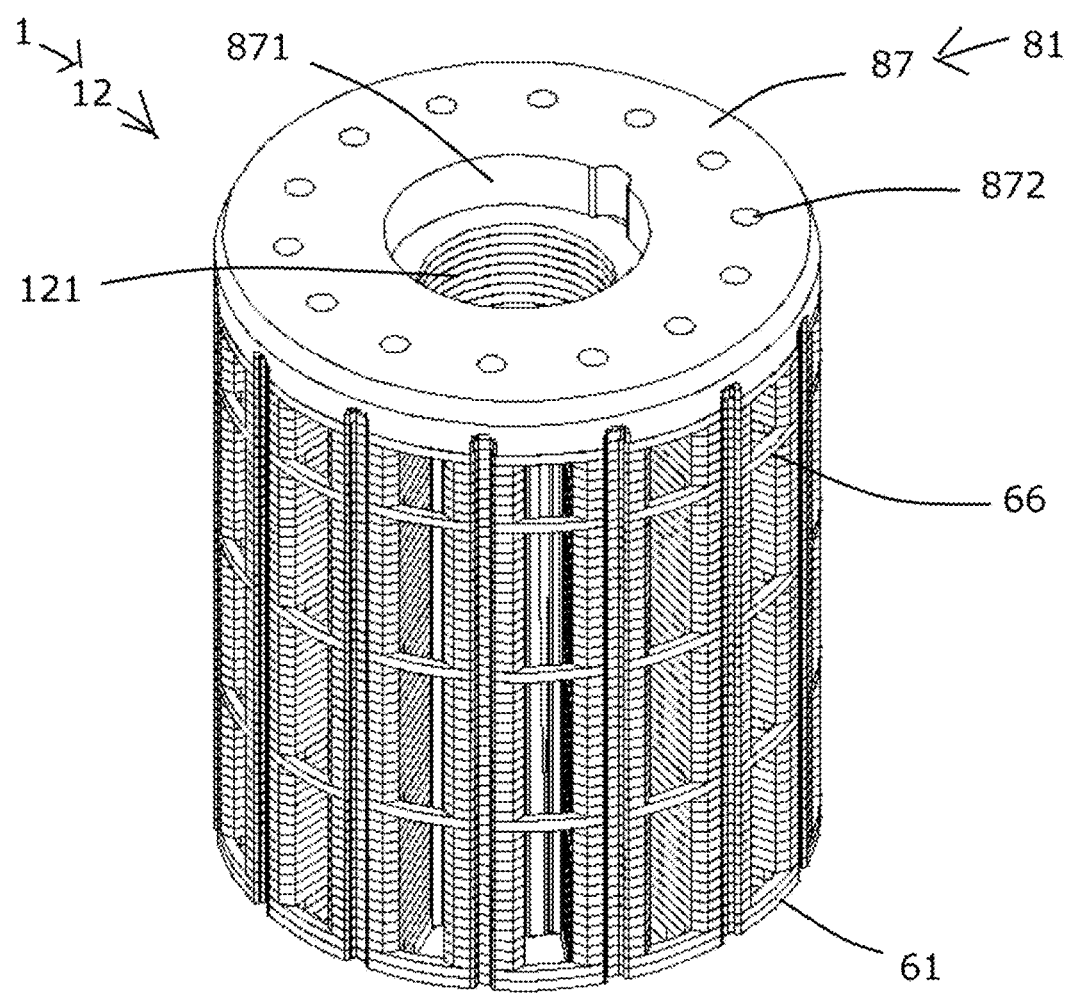
FIG. 3 is a perspective view of a rotor according to an example embodiment of the present disclosure as viewed from below.
Figure 4:
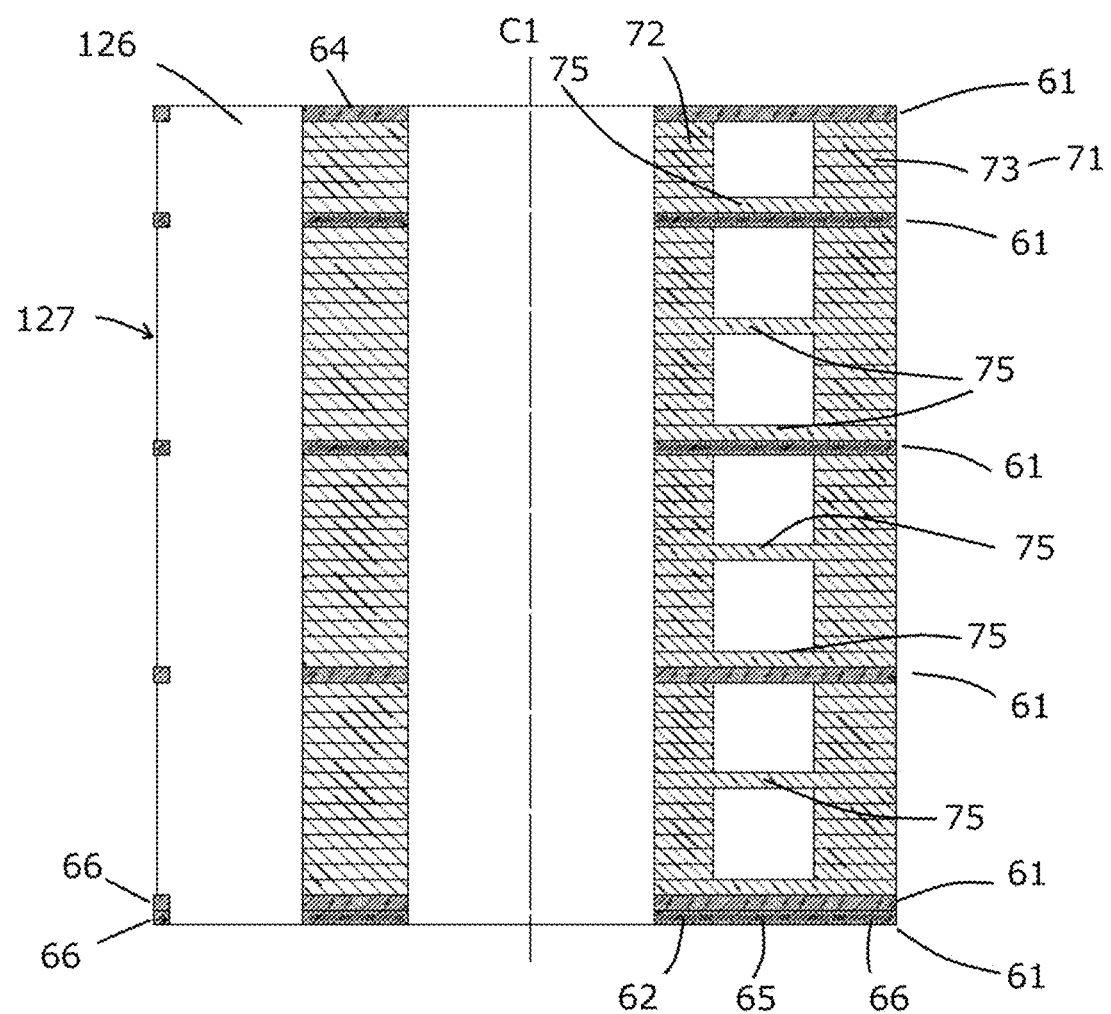
FIG. 4 is a cross-sectional view of a rotor core according to an example embodiment of the present disclosure.
Figure 5:
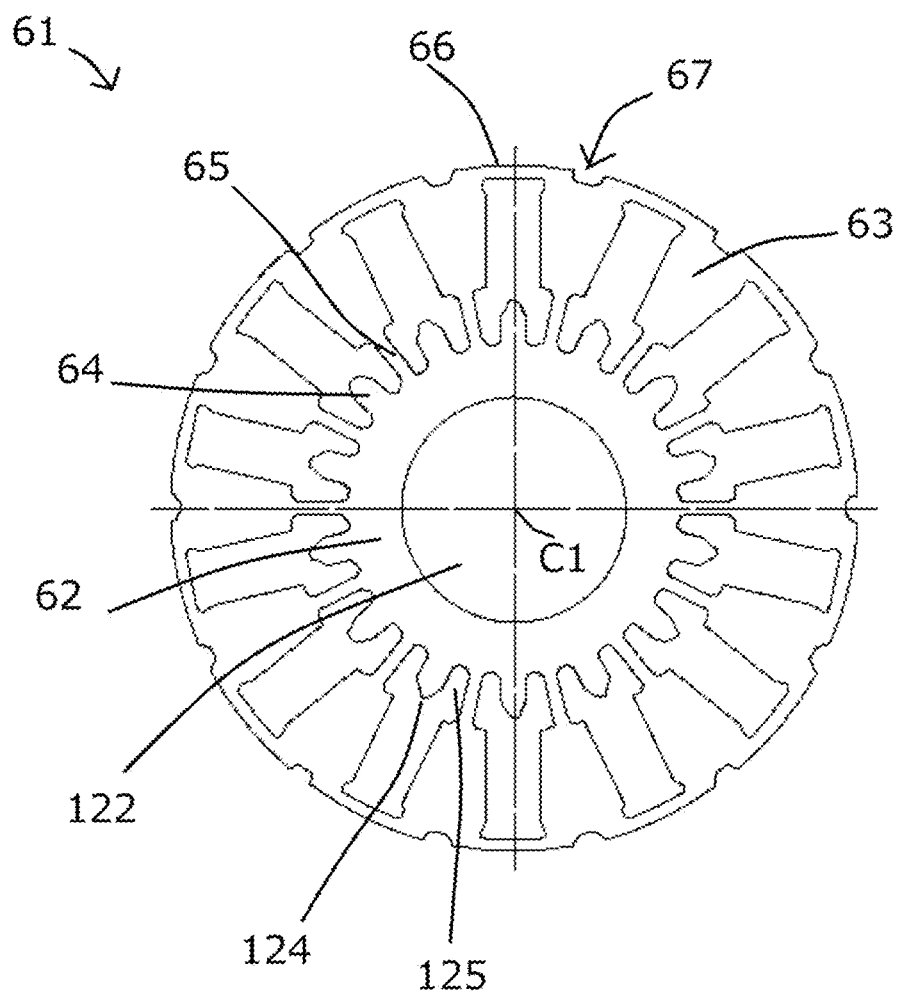
FIG. 5 is a plan view of a first thin plate core according to an example embodiment of the present disclosure.
Figure 6:
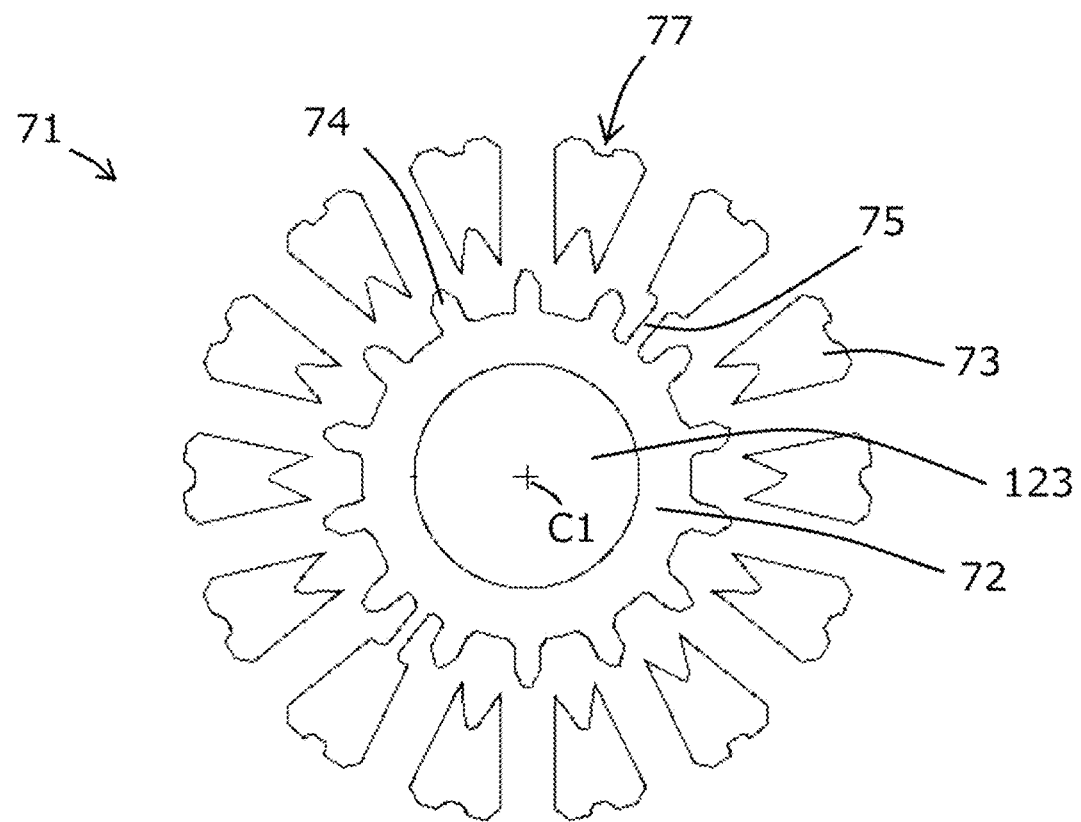
FIG. 6 is a plan view of a second thin plate core according to an example embodiment of the present disclosure.

FIG. 2 is a perspective view of the rotor 1 according to the present example embodiment as viewed from above. FIG. 3 is a perspective view of the rotor 1 according to the present example embodiment as viewed from below. FIG. 4 is a cross-sectional view of the rotor core 12 according to the present example embodiment. FIG. 5 is a plan view of a first thin plate core 61 according to the example embodiment. FIG. 6 is a plan view of a second thin plate core 71 according to the present example embodiment. As illustrated in FIGS. 2 to 4, the rotor core 12 includes a plurality of the first thin plate cores 61 and a plurality of the second thin plate cores 71. The second thin plate cores 71 are laminated in the axial direction. The first thin plate cores 61 are arranged on the axially upper and lower sides of the second thin plate cores 71, laminated in the axial direction, respectively. That is, the first thin plate cores 61 are arranged respectively on both sides in the axial direction of the second thin plate core 71. In other words, the plurality of second thin plate cores 71 are sandwiched between the first thin plate cores 61 in the axial direction. The plurality of first thin plate cores 61 are laminated at a lower portion on the axially lower side of the rotor core 12.

As illustrated in FIG. 5, the first thin plate core 61 includes a first inner plate 62 and a plurality of first outer plates 63 and first inner connecting portions 65.

The first inner plate 62 is a substantially annular portion. The first inner plate 62 has a first shaft hole 122, which penetrates the first inner plate 62 in the axial direction, at the center. The shaft 11 passes through the first shaft hole 122 and is directly or indirectly fixed to the first inner plate 62.

When viewed from the axial direction, the first outer plate 63 has a substantially fan shape. The respective first outer plates 63 are arranged on the radially outer side of the first inner plate 62. The first outer plates 63 are arranged at intervals in the circumferential direction. That is, the plurality of first outer plates 63 are arrayed side by side in the circumferential direction. A circumferential width of the first outer plate 63 increases toward the radially outer side. The number of first outer plates 63 in the present example embodiment is the same as the number of magnets. That is, the number of first outer plates 63 is fourteen.

The first inner connecting portion 65 connects the first inner plate 62 and the first outer plate 63. The first inner connecting portion 65 extends from a radially outer end of the first inner plate 62 to a radially inner end of the first outer plate 63. The radially inner end of each of the first outer plates is connected to the first inner connecting portion 65. A circumferential width of the first inner connecting portion 65 is substantially constant. The circumferential width of the first inner connecting portion 65 is smaller than the circumferential width of the first outer plate 63. In the present example embodiment, the number of first inner connecting portions 65 is the same as the number of first outer plates 63. That is, each of the first outer plates 63 is connected to the first inner plate 62 via the first inner connecting portion 65.

The first outer connecting portion 66 is an annular portion. The first outer connecting portion 66 is located on the radially outer side of the first outer plate 63. The first outer connecting portion 66 connects radially outer ends of the first outer plates 63 in the circumferential direction. That is, the radially outer ends of the respective first outer plates 63 are connected to the first outer connecting portion 66. In other words, the first outer connecting portion 66 connects the adjacent first outer plates 63 to each other in the circumferential direction. The first outer connecting portion 66 is integrated with the first outer plate 63. The first outer plate 63 has a first outer plate recess 67, which is recessed toward the radially inner side, at the radially outer end.

The first inner plate 62 has a plurality of first protrusions 64. The first protrusion 64 extends from the radially outer end of the first inner plate 62 toward the radially outer side. The first protrusions 64 are arranged at intervals in the circumferential direction. Each of the first protrusions 64 is located between the adjacent first outer plates 63 in the circumferential direction. Each of the first protrusions 64 is located between the first inner connecting portions 65 adjacent in the circumferential direction. That is, the first protrusions 64 and the first inner connecting portions 65 are alternately arranged in the circumferential direction. A circumferential width at a radially outer end of the first protrusion 64 gradually decreases toward the radially outer side.

A first inner gap 124 is formed between the first protrusion 64 and the first inner connecting portion 65 in the circumferential direction. A second inner gap 125 is formed between the radially outer end of the first protrusion 64 and a radially inner end of the magnet.

The second thin plate core 71 includes a second inner plate 72, second outer plates 73, and second inner connecting portions 75 with reference to FIG. 6. The second inner plate 72 is a substantially annular portion. The second inner plate 72 has a second shaft hole 123, which penetrates the second inner plate 72 in the axial direction, at the center. The shaft 11 passes through the second shaft hole 123 and is directly or indirectly fixed to the second inner plate 72. When the first thin plate core 61 and the second thin plate core 71 are laminated, the second shaft hole 123 overlaps the first shaft hole 122 in the axial direction. The first shaft hole 122 and the second shaft hole 123 constitute one through-hole (that is, a shaft hole 121) through which the shaft passes.

The second outer plates 73 are arranged on the radially outer side of the second inner plate 72, and are arranged at intervals in the circumferential direction. That is, the plurality of second outer plates 73 are arrayed side by side in the circumferential direction. A circumferential width of the second outer plate 73 increases toward the radially outer side. The second outer plate 73 has a second outer plate recess 77, which is recessed toward the radially inner side, at a radially outer end.

In the present example embodiment, the number of second outer plates 73 is the same as the number of magnets. That is, the number of second outer plates 73 is fourteen. The number of second outer plates 73 of the second thin plate core 71 is the same as the number of first outer plates 63 of the first thin plate core 61. When a first laminated core and a second laminated core are laminated, the second outer plate 73 overlaps the first outer plate 63 in the axial direction.

The second thin plate core 71 has the two second inner connecting portions 75 in the present example embodiment. The two second inner connecting portions 75 are arranged respectively at positions that are symmetric with the central axis as a reference. In other words, the two second inner connecting portions 75 are arranged respectively at positions shifted by 180 degrees in the circumferential direction with the central axis as the reference. The second inner connecting portion 75 extends toward the radially outer side from the second inner plate 72 and is connected to a radially inner end of the second outer plate 73. That is, at least one of the second inner connecting portions 75 connects the second inner plate 72 and the second outer plate 73 in the radial direction. In the present example embodiment, only the two second outer plates 73 are connected to the second inner plate 72 via the second inner connecting portion 75.

The second inner plate 72 has a plurality of second protrusions 74. The second protrusion 74 extends from the radially outer end of the second inner plate 72 toward the radially outer side. The second protrusions 74 are arranged at intervals in the circumferential direction. Each of the second protrusions 74 is located between the adjacent second outer plates 73 in the circumferential direction. In other words, at least one of the second outer plates 73 is located between the adjacent second protrusions 74 in the circumferential direction. The second inner connecting portion 75 is located between the second protrusions 74 adjacent in the circumferential direction.

As described above, the plurality of second thin plate cores 71 are laminated in the axial direction. Here, the respective second thin plate cores 71 are rotated in the circumferential direction each by a predetermined angle around the central axis and laminated in the axial direction. In the present example embodiment, the respective second thin plate cores 71 are rotated each by an angle corresponding to a value obtained by dividing 360 degrees by the number of second outer plates 73 or the number of magnets and laminated in the axial direction. As described above, the number of outer plates and the number of magnets are fourteen. Therefore, the respective second thin plate cores 71 are rotated each by an angle of a value obtained by dividing 360 degrees by fourteen and laminated.

In the present example embodiment, the plurality of second thin plate cores 71 are arranged in the axial direction as a set. The number of laminated second thin plate cores 71 can be made equal to the number of second outer plates 73, for example. In addition, the single rotor core 12 can be configured by laminating a plurality of sets of the plurality of laminated second thin plate cores 71 in the axial direction. The rotor core 12 in the present example embodiment has one set of fourteen second thin plate cores 71 and one set of six second thin plate cores 71. In this case, the second inner connecting portions 75 of the respective second thin plate cores 71 have different axial positions, and are also shifted in the circumferential direction each by an angle of a value obtained by dividing 360 degrees by the number of second outer plates 73 or the number of magnets. In other words, the second inner connecting portions 75 of the adjacent second thin plate cores 71 have different positions in the axial direction, and are also shifted in the circumferential direction by the angle of the value obtained by dividing 360 degrees by the number of second outer plates 73 or the number of magnets. In the present example embodiment, the second inner connecting portions 75 of one set of the second thin plate cores 71 do not overlap each other in the axial direction. When viewed from the axial direction, each of the second inner connecting portions 75 overlaps the first inner connecting portion 65 in the axial direction. That is, each of the second inner connecting portions 75 overlaps any one of the first inner connecting portions 65 in the axial direction.

Spaces on both sides in the circumferential direction of the two second inner connecting portions 75 are filled with a resin 81 as will be described later. A space between the second inner plate 72 and the second outer plate 73, which are not connected by the second inner connecting portion 75, is filled with the resin 81 as will be described later. That is, a space between the first inner connecting portions 75 and each of the first thin plate cores 61 arranged on the axially both sides in the axial direction and between the second inner plate 72 and the second outer plate 73 in the radial direction is filled with the resin 81. As a result, the second inner plate 72 and the second outer plate 73, which are not connected by the second inner connecting portion 75, are connected, and the first inner connecting portions 75 located in the axial direction are connected to each other so that the connection between the first thin plate core 61 and the second thin plate core 71 can be strengthened.

The first thin plate cores 61 are arranged on the axially upper and lower sides of the above one set of second thin plate cores 71, respectively. That is, the second thin plate cores 71 are laminated in the axial direction, and sandwiched between the pair of first thin plate cores 61 from both the sides in the axial direction. In the present example embodiment, the first thin plate cores 61 are arranged one by one on the axially upper and lower sides of one set of the second thin plate cores 71.

An electromagnetic steel plate located on the lowermost side in the axial direction in the rotor core 12 is the first thin plate core 61. That is, the plurality of first thin plate cores are arranged on the axially lower side of the plurality of second thin plate cores 71 on the axially lower side of the rotor core 12. That is, the first thin plate core 61 is further laminated on axially one side of the pair of first thin plate cores 61. In the present example embodiment, the plurality of first thin plate cores 61 are located and laminated at the lowest stage of the rotor core 12.

The first inner plate 62 of the first thin plate core 61 overlaps the second inner plate 72 of the second thin plate core 71 in the axial direction. The first protrusion 64 of the first thin plate core 61 overlaps the second protrusion 74 of the second thin plate core 71 in the axial direction. The first inner plates 62 of the first thin plate cores 61 adjacent in the axial direction overlap each other in the axial direction on the axially lower side of the rotor core 12. The first protrusions 64 of the first thin plate cores 61 adjacent in the axial direction overlap each other in the axial direction. The second inner plates 72 of the second thin plate cores 71 adjacent in the axial direction overlap each other in the axial direction. The second protrusions 74 of the second thin plate cores 71 adjacent in the axial direction overlap each other in the axial direction.

In the circumferential direction, a position of the first outer plate 63 of the first thin plate core 61 is the same as a position of the second outer plate 73 of the second thin plate core 71. That is, the first outer plate 63 of each of the first thin plate cores 61 overlaps the second outer plate 73 of each of the second thin plate cores 71 in the axial direction. The first outer plates 63 of the first thin plate cores 61 adjacent in the axial direction overlap each other in the axial direction on the axially lower side of the rotor core 12. The second outer plates of the second thin plate cores 71 adjacent in the axial direction overlap each other in the axial direction.

Each of the second inner connecting portions 75 of each of the second thin plate cores 71 overlaps the first inner connecting portion 65 of the first thin plate core 61, which has the same circumferential position, in the axial direction. The second inner connecting portion 75 opposes the first inner connecting portion 65 with a clearance in the axial direction except for the second thin plate cores 71 located at upper and lower ends in the axial direction among one set of the second thin plate cores 71. Of one set of the second thin plate cores 71, the second inner connecting portions 75 of the second thin plate cores 71 located at the upper and lower ends in the axial direction overlap the first inner connecting portions 65 of the first thin plate cores 61, adjacent to each other in the axial direction, in the axial direction.

When viewed from the axial direction, the first inner gaps 124, which are through-holes penetrating the rotor core 12 in the axial direction, are formed on both sides in the circumferential direction of the first inner connecting portion 65 and the second inner connecting portion 75. The inside of the first inner gap 124 is filled with the resin 81 as will be described later.

When viewed from the axial direction, the second inner gaps 125 are formed between the magnet and the radially outer end of the first protrusion 64 in the radial direction and between the magnet and the radially outer end of the second protrusion 74 in the radial direction. The second inner gap 125 is a through-hole that penetrates the rotor core 12 in the axial direction. The inside of the second inner gap 125 is filled with the resin 81 as will be described later.

The first thin plate core 61 and the second thin plate core 71 are fixed by caulking, for example. The caulking is performed between the first inner plate 62 of the first thin plate core 61 and the second inner plate 72 of the second thin plate core 71. Similarly, the caulking is also performed between the first outer plate 63 of the first thin plate core 61 and the second outer plate 73 of the second thin plate core 71. Between the first inner plate 62 and the second inner plate 72, the caulking may be performed at several sites at intervals in the circumferential direction, or the caulking may be performed in an annular shape. Between the first outer plate 63 and the second outer plate 73, the caulking may be performed on all the outer plates or may be performed only on some of the outer plates arranged in the circumferential direction. The first thin plate core 61 and the second thin plate core 71 may be fixed by adhesion, laser welding, or the like.

Similarly, the second thin plate cores 71 adjacent in the axial direction are also fixed by caulking, for example. Even between the second thin plate cores 71, the second inner plates 72 overlapping each other in the axial direction and the second outer plates 73 overlapping each other in the axial direction are fixed by caulking. Between the second inner plates 72, the caulking may be performed at several sites at intervals in the circumferential direction, or the caulking may be performed in an annular shape. Between the second outer plates 73, the caulking may be performed on all the second outer plates 73 or may be performed only on some of the second outer plates 73 arrayed side by side in the circumferential direction. The second thin plate cores 71 may be fixed to each other by adhesion, laser welding, or the like.

In the circumferential direction, a position of each first magnet hole of the first thin plate core 61 is the same as a position of each second magnet hole of the second thin plate core 71. Therefore, the first magnet hole of the first thin plate core 61 and the second magnet hole of the second thin plate core 71 are combined to form the magnet hole 126 whose inner surface extends in the axial direction. The magnet is accommodated in each of the magnet holes 126 of the rotor core 12.

The first outer plates 63 of the first thin plate core 61 are arranged at intervals in the circumferential direction as described above. The second outer plates 73 of the second thin plate core 71 are arranged at intervals in the circumferential direction. Therefore, the rotor core 12 has an outer opening 127, which communicates with the magnet hole 126 to be open on the radially outer side, on the outer surface. The outer opening is divided into a plurality of portions in the axial direction by the first outer connecting portions 66 of the first thin plate cores 61 arranged to sandwich the plurality of second thin plate cores 71 in the axial direction. When the magnet is inserted into the magnet hole 126, the first outer connecting portion 66 opposes or comes into contact with the magnet in the radial direction. As a result, it is possible to inhibit the magnet from moving toward the radially outer side by an impact from the outside.

The plurality of first thin plate cores 61 are arranged to be laminated on the axially lower side of the rotor core 12 as described above. An axially lower portion of the magnet opposes or comes into contact with the plurality of first outer connecting portions 66 in the radial direction. As a result, it is possible to inhibit the magnet from moving toward the radially outer side by an impact from the outside. In addition, the axially lower side of the rotor core 12 is covered with the resin 81 as will be described later. With the above structure, it becomes easy to bring a mold into close contact with an outer circumferential surface of the rotor core 12 when the rotor core 12 is arranged inside the mold and a molten resin is poured and solidified. As a result, the resin does not enter between the outer circumferential surface of the rotor core 12 and the mold, and it is possible to inhibit the extra resin from attaching to the surface of the rotor core 12. In addition, the plurality of first outer connecting portions 66 at the axially lower portion of the magnet can be used as a support portion configured for resin cutting. As a result, the rotor 1 does not have a thin resin with low rigidity, and the rigidity of the entire rotor 1 can be increased.

In addition, the plurality of second thin plate cores 71 are laminated in the axial direction while being rotated in the circumferential direction by a predetermined angle as described above, and thus, it is possible to reduce a dimensional error caused by the tolerance of each of the thin plate cores when laminated. As a result, the dimensional accuracy of the rotor core 12 can be increased.

In addition, at least a part of the magnet is exposed from at least any one of an axially upper opening of the magnet hole 126, an axially lower opening of the magnet hole 126, and the outer opening. In the present example embodiment, the magnet is exposed from the outer opening. Therefore, the magnet directly opposes the stator in the radial direction. As a result, the magnetic flux between the rotor 1 and the stator can easily flow, and it is possible to increase a torque as compared to a case where a resin covers a magnet.

Figure 7:
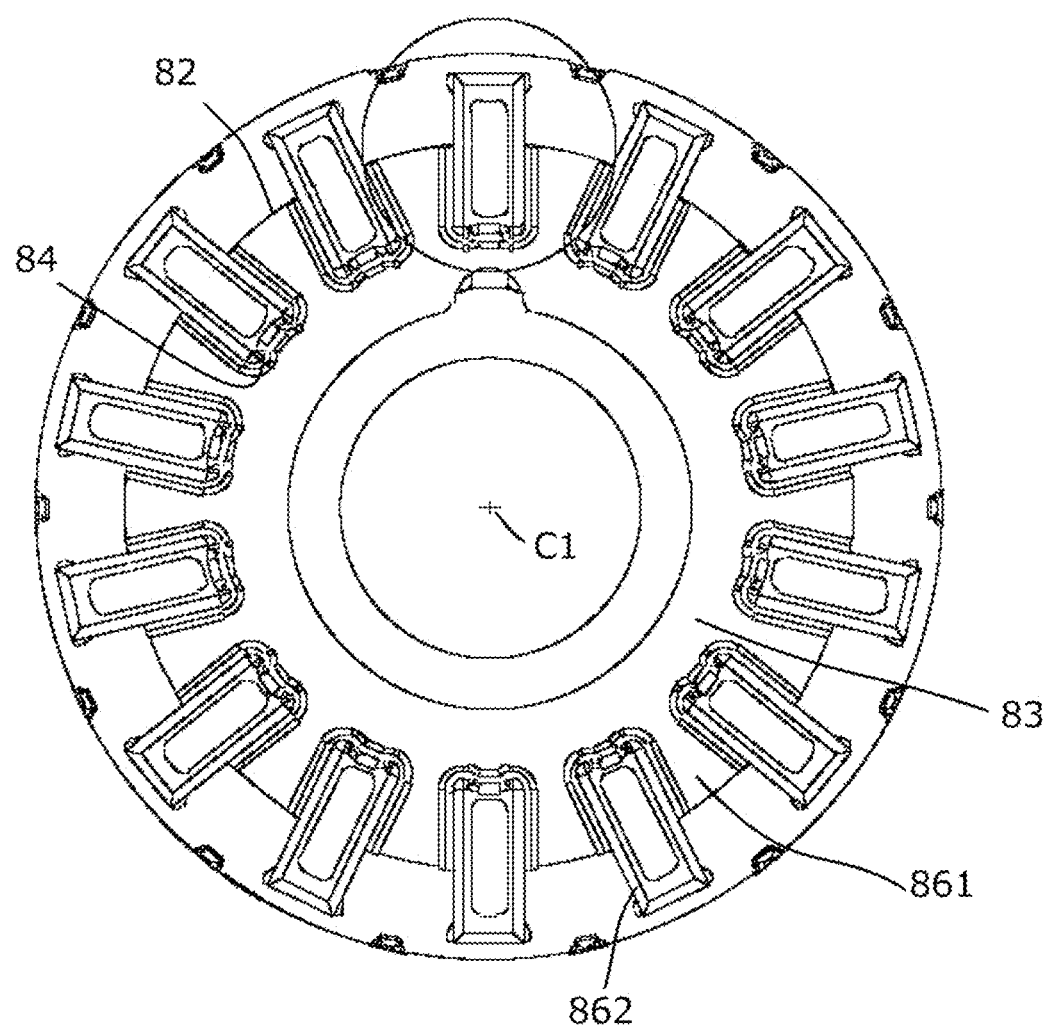
FIG. 7 is a plan view of a rotor according to an example embodiment of the present disclosure.
Figure 8:
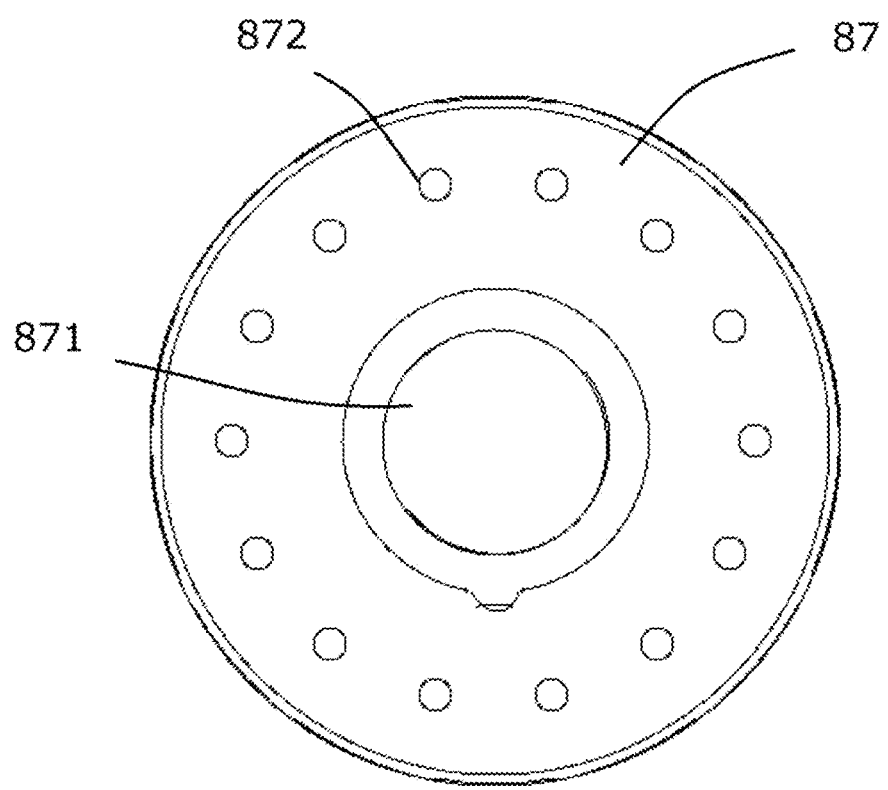
FIG. 8 is a rear view of a rotor according to an example embodiment of the present disclosure.
Figure 9:
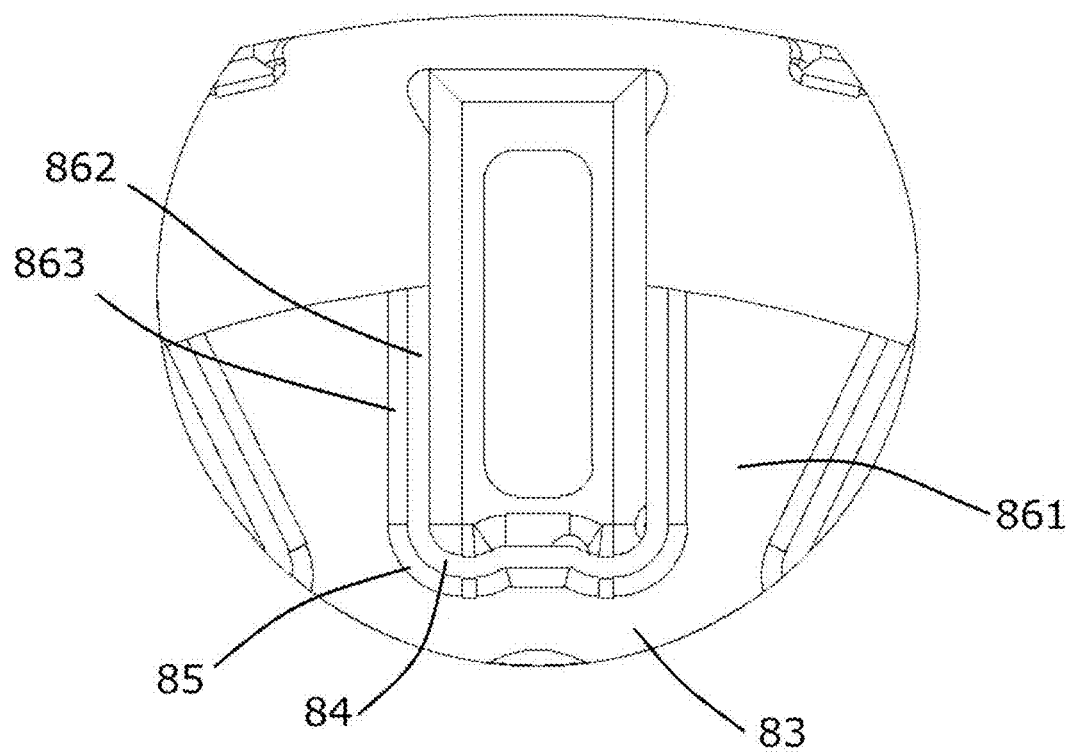
FIG. 9 is a partial enlarged view of an upper surface of a rotor according to an example embodiment of the present disclosure.
Figure 10:
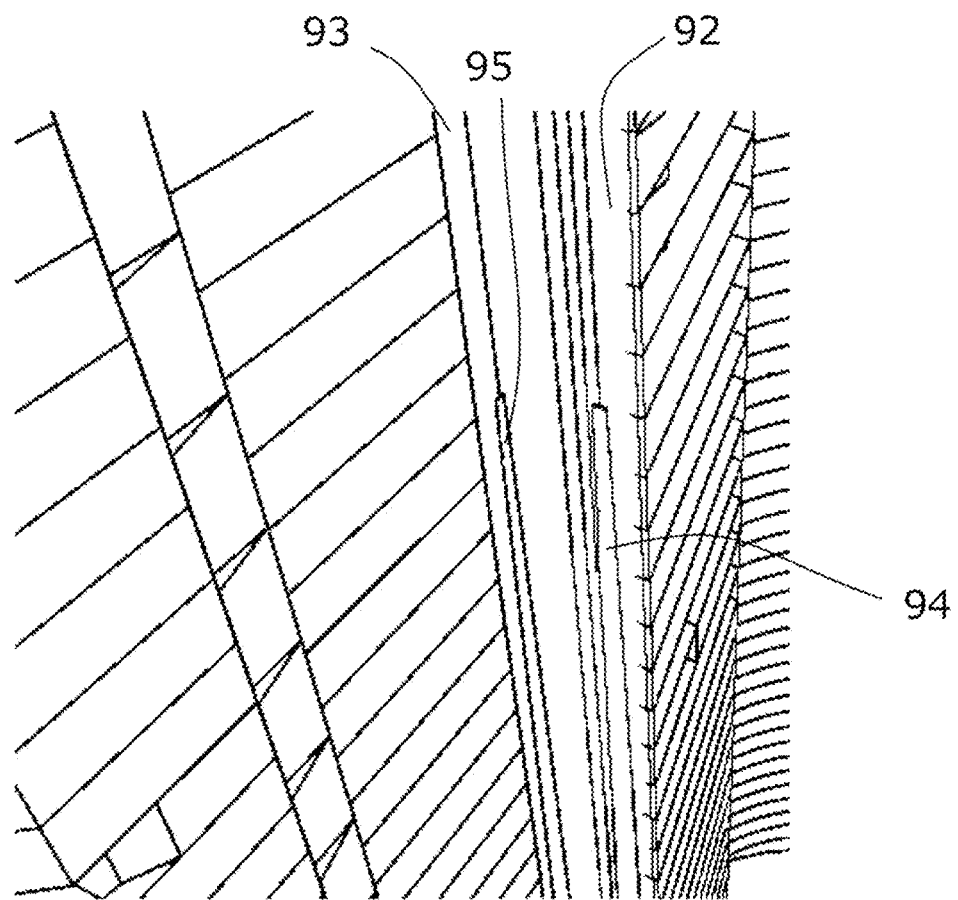
FIG. 10 is a partial cross-sectional view of a rotor according to an example embodiment of the present disclosure.

FIG. 7 is a plan view of the rotor 1 according to the example embodiment. FIG. 8 is a rear view of the rotor 1 according to the present example embodiment. FIG. 9 is a partial enlarged view of an upper surface of the rotor 1 according to the present example embodiment. FIG. 9 illustrates a portion surrounded by a circle in FIG. 7 in an enlarged manner. FIG. 10 is a partial cross-sectional view of the rotor 1 according to the example embodiment. The resin 81 covers at least a part of the rotor core 12. The resin 81 includes an upper resin 82, a lower resin 87, and a connecting resin 91.

The lower resin 87 covers an axially lower end surface of the rotor core 12. The lower resin 87 has a first lower hole 871 penetrating the lower resin 87 in the axial direction and a plurality of second lower holes 872 penetrating the lower resin 87 in the axial direction. The shaft passes through the first lower hole 871. The plurality of second lower holes 872 are arranged at intervals in the circumferential direction on the radially outer side of the first lower hole 871.

The upper resin 82 covers an axially upper end surface of the rotor core 12. The upper resin 82 has an upper annular portion 83 and an outer resin 86. The upper resin covers an upper surface of the first inner plate 62 and an upper surface of the first protrusion 64 in the first thin plate core 61 located on the uppermost side in the axial direction. That is, the upper annular portion 83 overlaps the inner plate of the first thin plate core 61, located on the uppermost side in axial direction, in the axial direction.

The outer resin 86 extends toward radially outer side from a radially outer end of the upper resin 82. The outer resin 86 covers at least a part of an upper surface of the first inner connecting portion 65 and an upper surface of the first outer plate 63 of the first thin plate core 61 located on the uppermost side in the axial direction. A circumferential width of a portion of the outer resin 86 covering the first outer plate 63 is substantially the same as the circumferential width of the first outer plate 63. That is, the circumferential width of the portion of the outer resin 86 covering the first outer plate 63 gradually increases toward the axially outer side. In the present example embodiment, the outer resin 86 covers not the whole but a part of the first outer plate 63. That is, the first thin plate core 61 located on the uppermost side in the axial direction has a portion exposed from the resin 81 and a portion covered by the outer resin 86.

The connecting resin 91 connects the upper resin 82 and the lower resin 87 in the axial direction. The lower resin 87 covers an axially lower end of the rotor core 12. As described above, the second inner gaps 125 are located respectively between the radially inner end of the magnet and the first protrusion 64 in the radial direction and between the radially inner end of the magnet and the second protrusion 74 in the radial direction. The second inner gap 125 communicates with the first inner gap 124. The connecting resin 91 is arranged inside the first inner gap 124 and the second inner gap 125. In other words, the connecting resin covers each of both side surfaces in the circumferential direction of the first protrusion 64 and the second protrusion 74. As a result, the first inner connecting portion 65 and the second inner connecting portion 75 are covered with the resin 81, and the rigidity of the rotor core 12 can be increased.

The connecting resin 91 includes a first connecting portion 92 and a second connecting portion 93.

The first connecting portion 92 covers the first protrusion 64, the second protrusion 74, and both the side surfaces in the circumferential direction of the first protrusion 64 and the second protrusion 74. In other words, the first connecting portion 92 covers the outer surfaces of the first inner plate 62 and the second inner plate 72. The first connecting portion 92 extends from the upper resin 82 to the lower resin 87. The first connecting portion 92 is a part of the other side surface in the circumferential direction of the resin 81 filling the inside of the first gap.

The second connecting portion 93 extends from the axially upper end of the rotor core 12 to the axially lower end. The second connecting portion 93 extends to the radially outer side from an end on one side in the circumferential direction of the first connecting portion 92. The second connecting portion 93 is adjacent to the first connecting portion 92 in the circumferential direction. The first outer plates 63 adjacent in the circumferential direction, the second outer plates 73 adjacent in the circumferential direction, the first connecting portion 92, and the second connecting portion 93 constitute a part of the inner surface forming the magnet hole 126. That is, the first connecting portion 92, the second connecting portion 93, the first outer plate 63, and the second outer plate 73 constitute at least a part of the inner wall forming the magnet hole 126.

FIG. 10 is a partial cross-sectional view of the rotor 1 according to the present example embodiment. In FIG. 10, the near side of the paper surface is the radially outer side, and the far side of the paper surface is the radially inner side. As illustrated in FIG. 10, the first connecting portion 92 has a first resin rib 94 protruding toward the radially outer side. The first resin rib 94 extends from a lower end of the first connecting portion 92 toward the axially upper side. That is, the first connecting portion 92 has the first resin rib 94 that protrudes to the radially outer side and extends in the axial direction. An axial length of the first resin rib 94 is, for example, between ½ and ⅔ of an axial dimension of the first connecting portion 92. As a result, it is possible to lower production cost by reducing the amount of resin to be used as compared to a case where the length of the first resin rib 94 is the same as the length of the first connecting portion 92. A circumferential width of the first resin rib 94 gradually decreases from the upper side toward the lower side in the axial direction. As a result, a metallic mold can be removed easily when the first resin rib 94 is formed by injection molding using a resin.

The second connecting portion 93 has a second resin rib 95 that protrudes toward one side in the circumferential direction. The second resin rib 95 extends from a lower end of the second connecting portion 93 toward the axially upper side. That is, the second connecting portion 93 has the second resin rib that protrudes to the one side in the circumferential direction and extends in the axial direction. A length of the second resin rib 95 is, for example, between ½ and ⅔ of an axial dimension of the second connecting portion 93. As a result, it is possible to lower production cost by reducing the amount of resin to be used as compared to a case where the length of the second resin rib 95 is the same as the length of the second connecting portion 93. In the present example embodiment, the length of the second resin rib 95 is substantially the same as the length of the first resin rib 94. A radial width of the second resin rib 95 gradually decreases from the upper side toward the lower side in the axial direction. As a result, a metallic mold can be removed easily when the second resin rib 95 is formed by injection molding using a resin.

The second resin rib 95 is adjacent to the first resin rib 94 in the circumferential direction. When the magnet is inserted into the magnet hole 126, the first resin rib 94 presses the magnet toward the radially outer side, and the second resin rib 95 presses the magnet toward the other side in the circumferential direction. That is, the first resin rib 94 and the second resin rib 95 press the magnet. As a result, the first resin rib 94 and the second resin rib 95 are elastically deformed, and the magnet is pressed in a diagonal direction of the magnet hole 126. As a result, it is possible to inhibit the magnet from moving inside the magnet hole 126 and to inhibit noise generated when the magnet hits the inner surface of the magnet hole 126.

As described above, the length of the first resin rib 94 and the length of the second resin rib 95 are, for example, between ½ and ⅔ of the axial dimension of the second connecting portion 93. That is, the axially upper ends of the first resin rib 94 and the second resin rib 95 do not reach axially upper ends of the first connecting portion 92 and the second connecting portion 93 in the present example embodiment. As described above, the radial width of the first resin rib 94 and the circumferential width of the second resin rib 95 are not constant in the axial direction in the present example embodiment. Therefore, the first resin rib 94 and the second resin rib 95 serve as guides when inserting the magnet into the magnet hole 126 so that the magnet can be smoothly inserted inside the magnet hole 126.

The outer resin 86 includes outer planar portions 861 and outer connection portions 862. The outer planar portion 861 is located on both sides in the circumferential direction of the outer resin 86. The outer planar portion 861 extends from an outer surface of the upper resin 82 toward the radially outer side.

The outer connection portions 862 are located respectively on both sides in the circumferential direction of the outer resin 86. The outer connection portion 862 connects the outer planar portion 861 and the upper surface of the outer resin 86. In the present example embodiment, the outer connection portion 862 is an inclined surface. However, the outer connection portion 862 may be a curved surface.

The upper resin 82 further has an upper planar portion 84 and an upper connection portion 85. The upper planar portion 84 is located at the radially outer end of the upper resin 82. More specifically, the upper planar portion 84 is located at the radially outer end of the upper annular portion 83. In the circumferential direction, the upper planar portion 84 is located between the adjacent outer resins 86. The upper planar portion 84 is connected to the outer planar portion 861. The upper planar portion 84 is on the same plane as the outer planar portion 861. That is, the upper planar portion 84 and the pair of outer planar portions 861 are substantially U-shaped when viewed from the axial direction.

The upper connection portion 85 connects the upper surface of the upper resin 82 and the upper planar portion 84. In the present example embodiment, the upper connection portion 85 is an inclined surface. However, the upper connection portion 85 may be a curved surface.

In the above-described present example embodiment, the second thin plate core 71 has the two second inner connecting portions 75. However, the second thin plate core may have only one second inner connecting portion 75, and do not necessarily have the second inner connecting portion 75. Even in such a case, it is desirable that the second thin plate cores be laminated in the axial direction such that axially upper and lower ends thereof are sandwiched between the first laminated steel plates.

Figure 11:
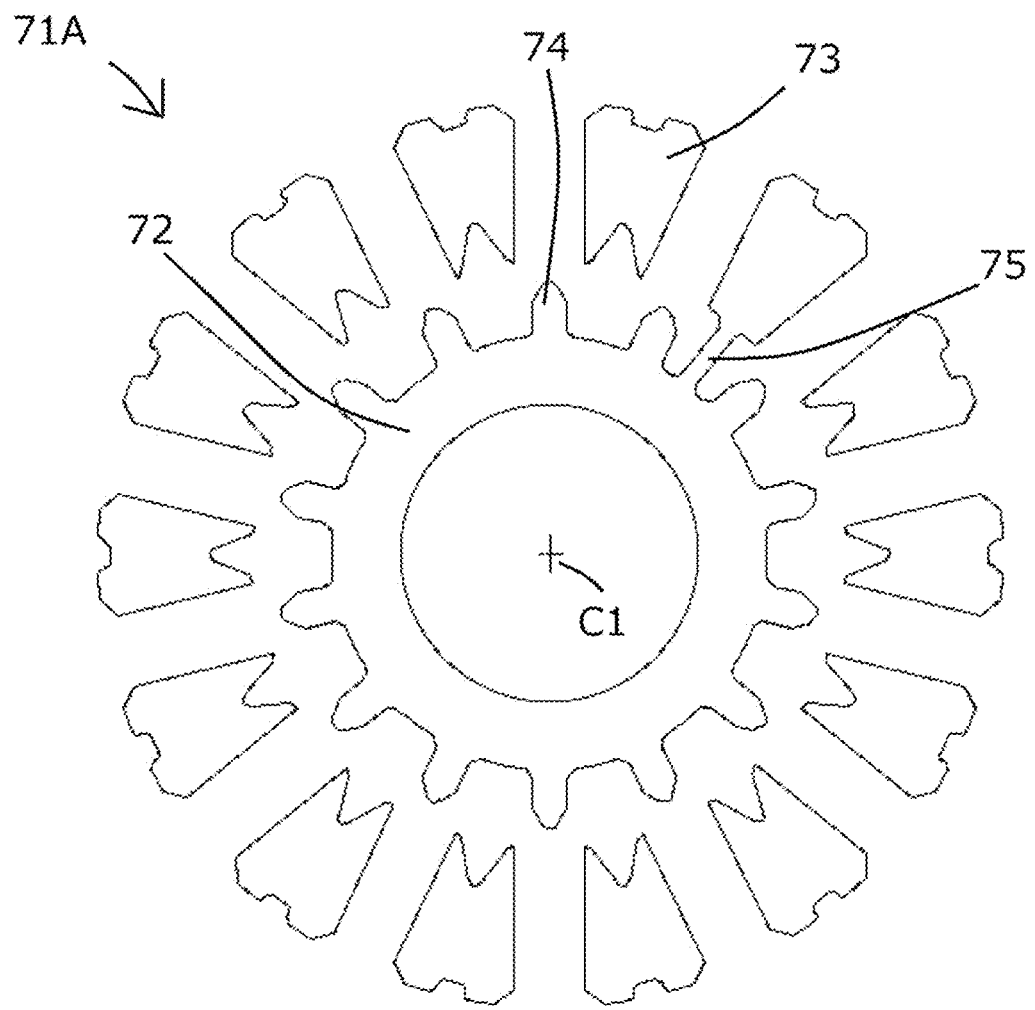
FIG. 11 is a plan view illustrating a modification of the second thin plate core according to an example embodiment of the present disclosure.

FIG. 11 is a plan view illustrating a modification of the second thin plate core. Even when a second thin plate core 71A has only one second inner connecting portion 75 as illustrated in FIG. 11, it is desirable that the second thin plate cores 71A be rotated by a predetermined angle in the circumferential direction and laminated as described above. The predetermined angle is, for example, a value obtained by dividing 360 degrees by the number of second outer plates 73 or the number of magnets. In addition, it is desirable that the laminated second thin plate cores 71A be sandwiched from both sides in the axial direction by the first thin plate cores 61. In the second thin plate core 71A on the same plane (that is, one piece of the second thin plate core 71A), the second outer plate 73 and the second inner plate 72 that does not have the second inner connecting portion 75 are connected only by a resin. That is, among the plurality of second outer plates 73 arrayed side by side in the circumferential direction, the second outer plate 73 that does not have the second inner connecting portion 75 is not magnetically connected to the second inner plate 72. Therefore, a short circuit of a magnetic flux between the second outer plates 73 that do not have the second inner connecting portion 75 does not occur. As a result, it is possible to improve magnetic characteristics.

Figure 12:
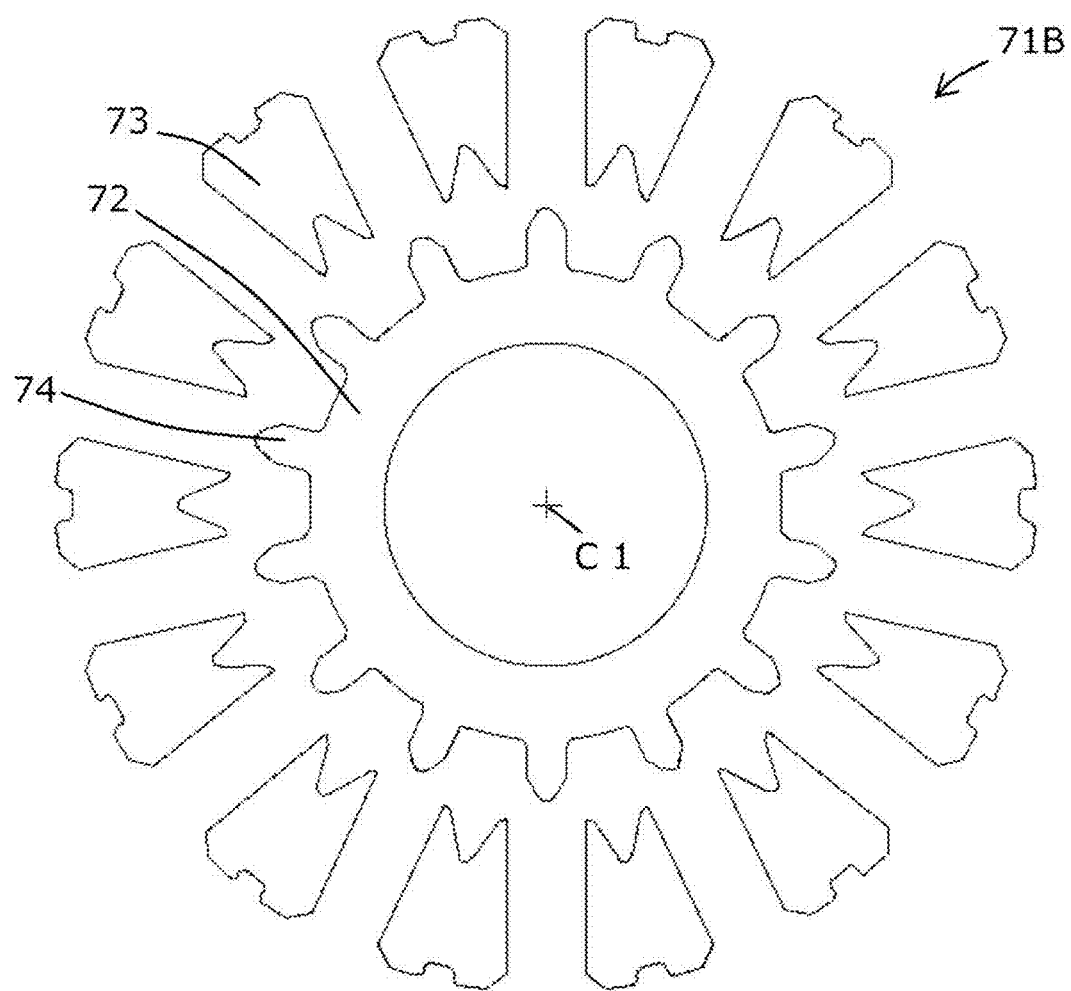
FIG. 12 is a plan view illustrating a modification of the second thin plate core according to an example embodiment of the present disclosure.

FIG. 12 is a plan view illustrating a modification of the second thin plate core. Even when a second thin plate core 71B does not have the second inner connecting portion 75 as illustrated in FIG. 12, it is desirable that the second thin plate cores 71B be rotated by a predetermined angle in the circumferential direction and laminated as described above. As a result, dimensional variations among the respective second thin plate cores 71 can be reduced. In addition, it is desirable that the laminated second thin plate cores 71B be sandwiched from both sides in the axial direction by the first thin plate cores 61. In the second thin plate core 71B on the same plane (that is, one piece of the second thin plate core 71B), the second outer plate 73 and the second inner plate 72 are connected only by a resin. That is, in one piece of the second thin plate core 71B located on the same plane, only the resin is interposed between the second inner plate 72 and the second outer plate 73.

In the above-described present example embodiment, the second thin plate cores 71 are laminated to be shifted by the predetermined angle in the circumferential direction. However, the second thin plate cores 71 are not necessarily shifted in the circumferential direction, and may be laminated in the axial direction with the predetermined angle being zero.

At least two or more of the second inner connecting portions 75 of one set of the second thin plate cores 71 may overlap each other in the axial direction. In addition, in the first thin plate core 61 and the second thin plate core 71 adjacent in the axial direction, the first protrusion 64 may be shifted from the second protrusion 74 in the circumferential direction, and the first outer plate 63 may be shifted from the second outer plate 73 in the circumferential direction if the magnet hole 126 is configured and the first connecting portion 92 and the second connecting portion 93 are configured.

An application of the motor according to the present example embodiment described above is not particularly limited. In addition, each configuration described in the present specification can be properly combined within a range having no contradiction.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor that extends in an axial direction with a central axis as a reference, the rotor comprising:
   magnets; and
   a rotor core that is defined by thin film cores laminated in the axial direction and includes magnet holes in which the magnets are located; wherein
   magnetic pole surfaces of the magnets oppose a circumferential direction;
   the magnet holes include openings extending in a radial direction in a plan view and penetrating the rotor core in the axial direction;
   the rotor core includes:
      first thin plate cores; and
      second thin plate cores;
   the first thin plate cores include:
      an annular first inner plate;
      first outer plates on a radially outer side of the first inner plate and arrayed side by side in the circumferential direction;
      first inner connecting portions connecting the first inner plate and the first outer plate; and
      a first outer connecting portion that is on a radially outer side of the first outer plate and connects the adjacent first outer plates in the circumferential direction;
   the second thin plate cores include:
      an annular second inner plate;
      second outer plates on a radially outer side of the second inner plate and arrayed side by side in the circumferential direction; and
      at least one second inner connecting portion that connects the second inner plate and the second outer plate in the radial direction;
   the second thin plate cores are laminated in the axial direction and are sandwiched from two sides in the axial direction by a pair of the first thin plate cores;

another one of the first thin plate cores is further laminated on one side in the axial direction of one of the pair of first thin plate cores; and the first outer connecting portions of the another one of the first thin plate cores and the one of the pair of first thin plate cores are directly adjacent to one another in the axial direction and both oppose or come into contact with one of the magnets in the radial direction.

2. The rotor according to claim 1, wherein a total number of the second inner connecting portions is two;

the second inner connecting portions are located at positions to be symmetric with the central axis as a center;

respective ones of the second thin plate cores are laminated in the axial direction to be shifted by a predetermined angle in the circumferential direction; and each of the second inner connecting portions overlaps one of the first inner connecting portions in the axial direction.

3. The rotor according to claim 2, wherein the angle is a value obtained by dividing 360 degrees by a total number of the second outer plates.

4. The rotor according to claim 1, wherein the rotor core includes:

an upper resin that covers an axially upper end of the rotor core;

a lower resin that covers an axially lower end of the rotor core; and a connecting resin that connects the upper resin and the lower resin in the axial direction;

the connecting resin includes:

a first connecting portion that covers outer surfaces of the first inner plate and the second inner plate; and a second connecting portion that extends in the radial direction from the first connecting portion;

the first connecting portion, the second connecting portion, the first outer plate, and the second outer plate define at least a portion of an inner wall defining the magnet hole;

the first connecting portion includes a first resin rib that protrudes to a radially outer side and extends in the axial direction;

the second connecting portion includes a second resin rib that protrudes to one side in the circumferential direction and extends in the axial direction; and the first resin rib and the second resin rib press the magnet.

5. The rotor according to claim 4, wherein an axial length of the first resin rib is between about ½ and about ⅔ of an axial length of the first connecting portion; and an axial length of the second resin rib is between about ½ and about ⅔ of an axial length of the second connecting portion.

6. The rotor according to claim 4, wherein a circumferential width of the first resin rib decreases as the first resin rib extends towards an axially upper side of the first resin rib; and a radial width of the second resin rib decreases as the second resin rib extends towards an axially upper side of the second resin rib.

7. A motor comprising:

the rotor according to claim 1; and a stator opposing the rotor in the radial direction.

* * * * *